(12) United States Patent
Muhlberger et al.

(10) Patent No.: US 7,295,427 B2
(45) Date of Patent: Nov. 13, 2007

(54) ELECTRICAL COMPONENT WITH FLUSH SIDE ACTION FASTENERS FOR A LOAD CENTER BASEPAN

(75) Inventors: Emily Elizabeth Muhlberger, Alpharetta, GA (US); Roland Joseph Montalbo, Cumming, GA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 176 days.

(21) Appl. No.: 11/290,126

(22) Filed: Nov. 30, 2005

(65) Prior Publication Data

US 2006/0114649 A1    Jun. 1, 2006

Related U.S. Application Data

(63) Continuation-in-part of application No. 10/998,684, filed on Nov. 29, 2004, now Pat. No. 7,245,480.

(51) Int. Cl.
*H02B 1/04*     (2006.01)

(52) U.S. Cl. .................. 361/634; 361/637; 361/645; 200/293; 200/294; 200/295; 174/166 S; 174/149 B; 174/71 B; 248/222.11; 248/224.51

(58) Field of Classification Search .............. 361/632, 361/634, 635, 636, 637, 642, 644–648, 649, 361/650–652; 174/71 B, 72 B, 99 B, 149 B, 174/166.5; 248/222.11, 224.51, 226.12, 248/227.3, 227.4; 200/293–295
See application file for complete search history.

(56) References Cited

U.S. PATENT DOCUMENTS

| | | | | |
|---|---|---|---|---|
| 3,075,039 A | * | 1/1963 | Kobryner | 174/99 B |
| 3,371,251 A | * | 2/1968 | Speck | 361/650 |
| 3,588,620 A | * | 6/1971 | Wasileski | 361/652 |
| 3,769,553 A | * | 10/1973 | Coley | 361/634 |
| 4,916,574 A | * | 4/1990 | Hancock et al. | 361/649 |
| 5,181,165 A | * | 1/1993 | Gehrs et al. | 361/637 |
| 5,337,211 A | * | 8/1994 | Reiner et al. | 361/637 |
| 5,420,749 A | * | 5/1995 | Gehrs et al. | 361/634 |
| 5,519,175 A | * | 5/1996 | Cole | 174/149 B |
| 6,362,952 B1 | * | 3/2002 | Schoonover et al. | 361/648 |
| 6,813,142 B1 | * | 11/2004 | Seff | 361/637 |

* cited by examiner

*Primary Examiner*—Michael Datskovskiy
(74) *Attorney, Agent, or Firm*—Rashmi Raj

(57) ABSTRACT

An apparatus and method for a load center comprising a basepan with fastener devices for securing bus bars, neutral bars, and a variety of other electrical components to the basepan. Each fastener device comprises a self aligning support post flush with two extending side walls and an arm with engaging lock. The self aligning support post and the two extending side walls are integrally formed where the self aligning support post projects away from the basepan first surface. The self aligning support post consists of at least one angled surface to facilitate assembly of the electrical component to the first surface of the basepan. The engaging lock has a first surface with an inclined angle with respect to the basepan and a second surface angled at zero degrees with respect to the basepan to facilitate securing the electrical component to basepan first surface.

26 Claims, 5 Drawing Sheets

ELECTRICAL COMPONENT WITH FLUSH SIDE ACTION FASTENERS FOR A LOAD CENTER BASEPAN

CROSS REFERENCE TO RELATED APPLICATION

This application is a continuation-in-part of U.S. Ser. No. 10/998,684 (2004P13841), which was filed on 29 Nov. 2004 now U.S. Pat. No. 7,245,480.

BACKGROUND

A load center is an enclosure used in electrical systems of all types for both conventional homes and commercial buildings for holding overcurrent devices or circuit breakers. A load center is the central point of distribution and overcurrent protection of an electrical system which includes panel, breaker panel, breaker box, main panel. For safety and convenience purposes, all overcurrent devices that protect structure wiring should be in a central location. Loads such as lights, electric motors, and appliances which consume electricity are the energy consuming devices in any electrical system. All of the wiring supplying the electrical loads in a building come together at individual breakers in the load center. The number of overcurrent devices in a load center is dictated by the total electrical consumption of the building and the type of load. A single breaker may protect many electrical receptacles.

An electric load center also generally consists of an insulated basepan on which several bus bars, neutral bars, neutral tie bars and other electrical components have been secured. Traditionally, electrical components have been secured to the basepan of a load center by using secondary hardware or common fastening devices such as screws and bolts. This can be cumbersome, time consuming to apply, uneconomical, require extra parts, and most importantly can impart stresses to the component being secured and adversely effect the structural integrity of the component. Similarly, heat staking or the plastic deformation of posts in a plastic basepan has also been employed to secure busbars to a basepan. The heat staking process requires a large amount of energy and time during the assembly process to achieve the desired amount of deformation. Similarly, the heat staking process imparts stresses which concentrate at the face of the basepan where the base of the post intersects the basepan to form corners. Such stress can significantly impair the integrity of the connection by causing a fracture of the post, loss of the integrity of the connection, and a decrease in the service life of the basepan and the load center. A need has therefore developed for an improved fastening device that will secure electrical components to a basepan.

SUMMARY OF INVENTION

In accordance with the invention, a load center comprising: an enclosure, a basepan mounted with the enclosure for distributing a load to a circuit breaker, a basepan first surface for securing electrical components with a fastener assembly wherein the fastener assembly comprising a self aligning support post structure flush with at least one extending side wall and an arm with engaging lock affixed thereto for securing the at least one electrical component to the basepan first surface.

In accordance with another aspect of this invention, a basepan for securing electrical components in a load center comprising: a basepan first surface wherein at least one electrical component is secured after mounting; a fastener assembly comprising a self aligning support post flush with at least one extending side wall and an arm with engaging lock affixed thereto for securing the at least one electrical component to the basepan first surface.

In accordance with another aspect of this invention, a method to secure an electrical component to a basepan, the method comprising: mounting the electrical component to the basepan; providing a fastening assembly comprising a self aligning support post flush with at least one extending side wall and an arm with engaging lock affixed thereto for securing the electrical component to the basepan first surface; and securing the electrical component with the fastening assembly.

It is an object of the invention to secure electrical components to an insulated surface or basepan first surface without the use of secondary hardware or equipment such as heat staking equipment, push nut insertion equipment or a mechanical press.

It is an object of the invention to reduce the amount of force required to assemble electrical components to the insulated surface or basepan first surface of a load center.

It is also an object of the invention to simplify the manufacturing process of the fastener assembly by reducing the number of parts required to secure the electrical components to the basepan.

DETAILED DESCRIPTION

Figure 1:
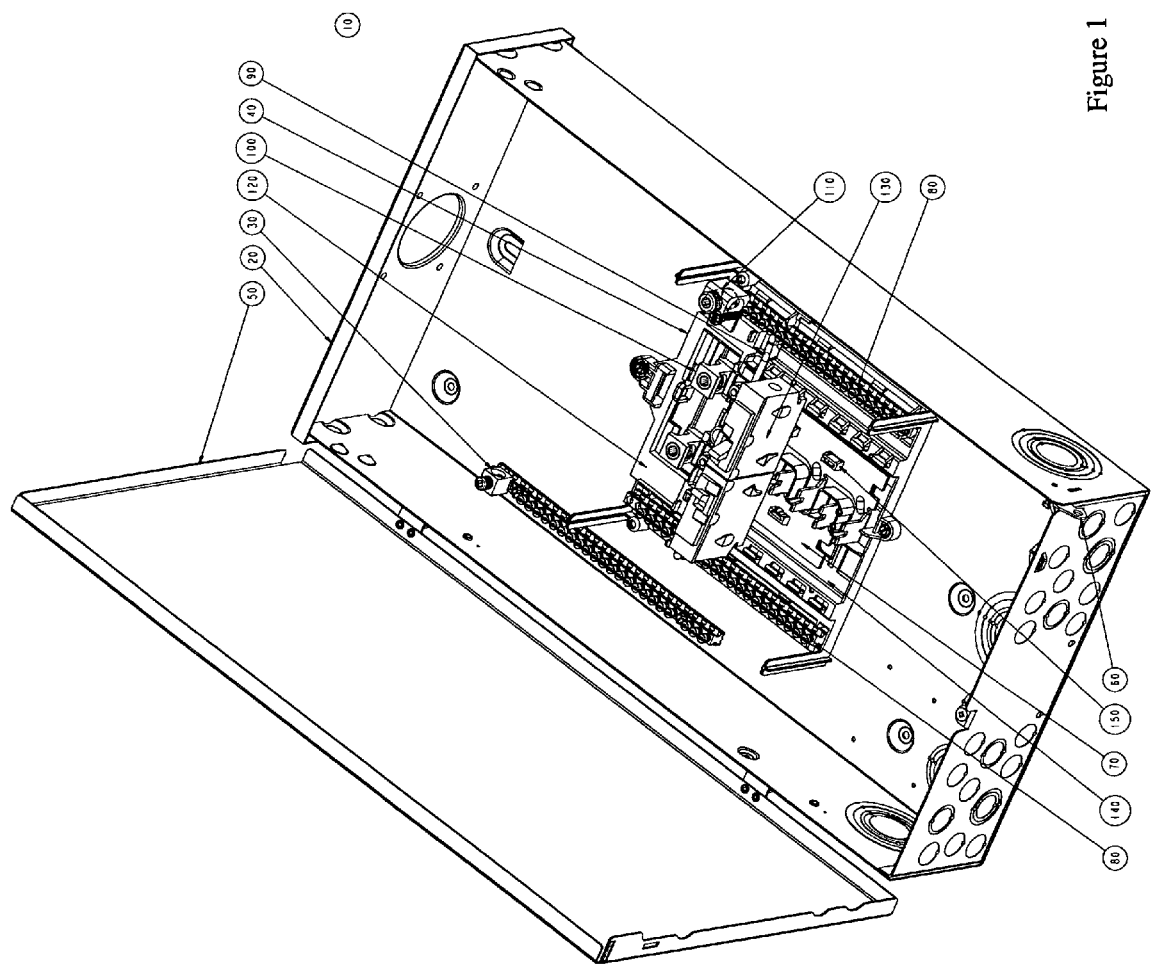
FIG. 1 shows an electrical fastener in a basepan in a load center.
Figure 2:
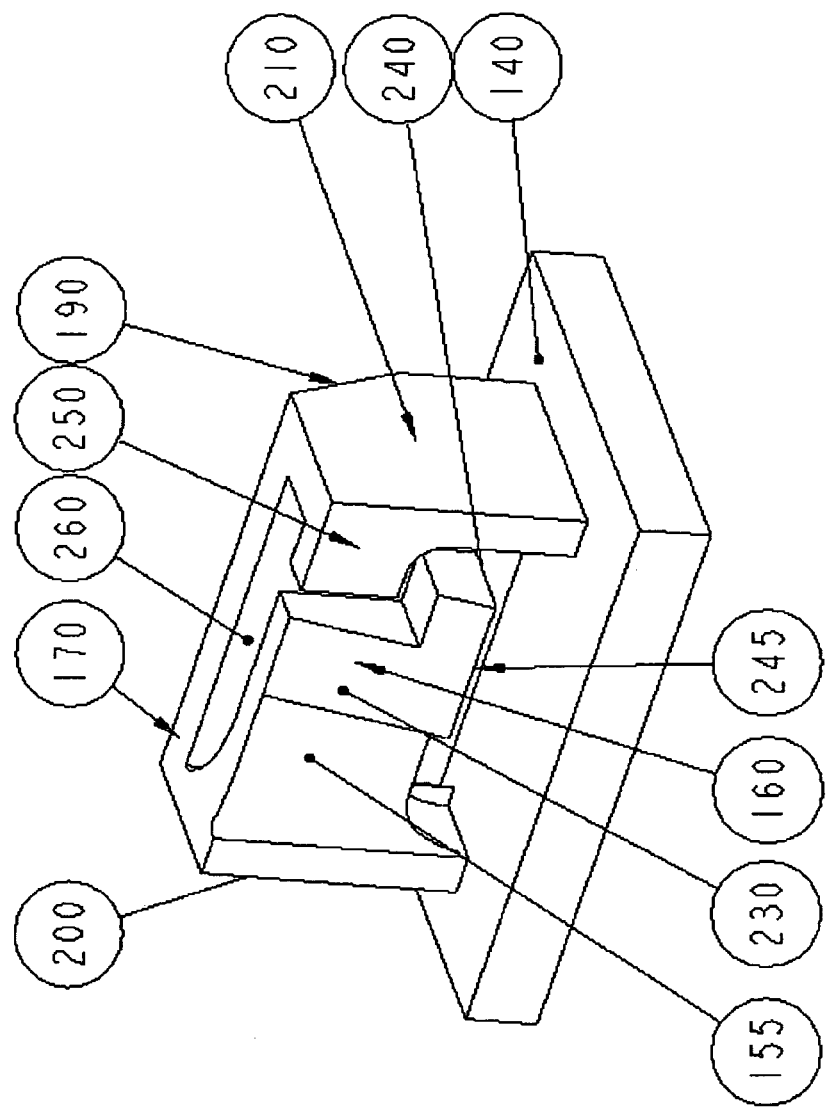
FIG. 2 shows a perspective view of the fastener for the present invention.
Figure 3:
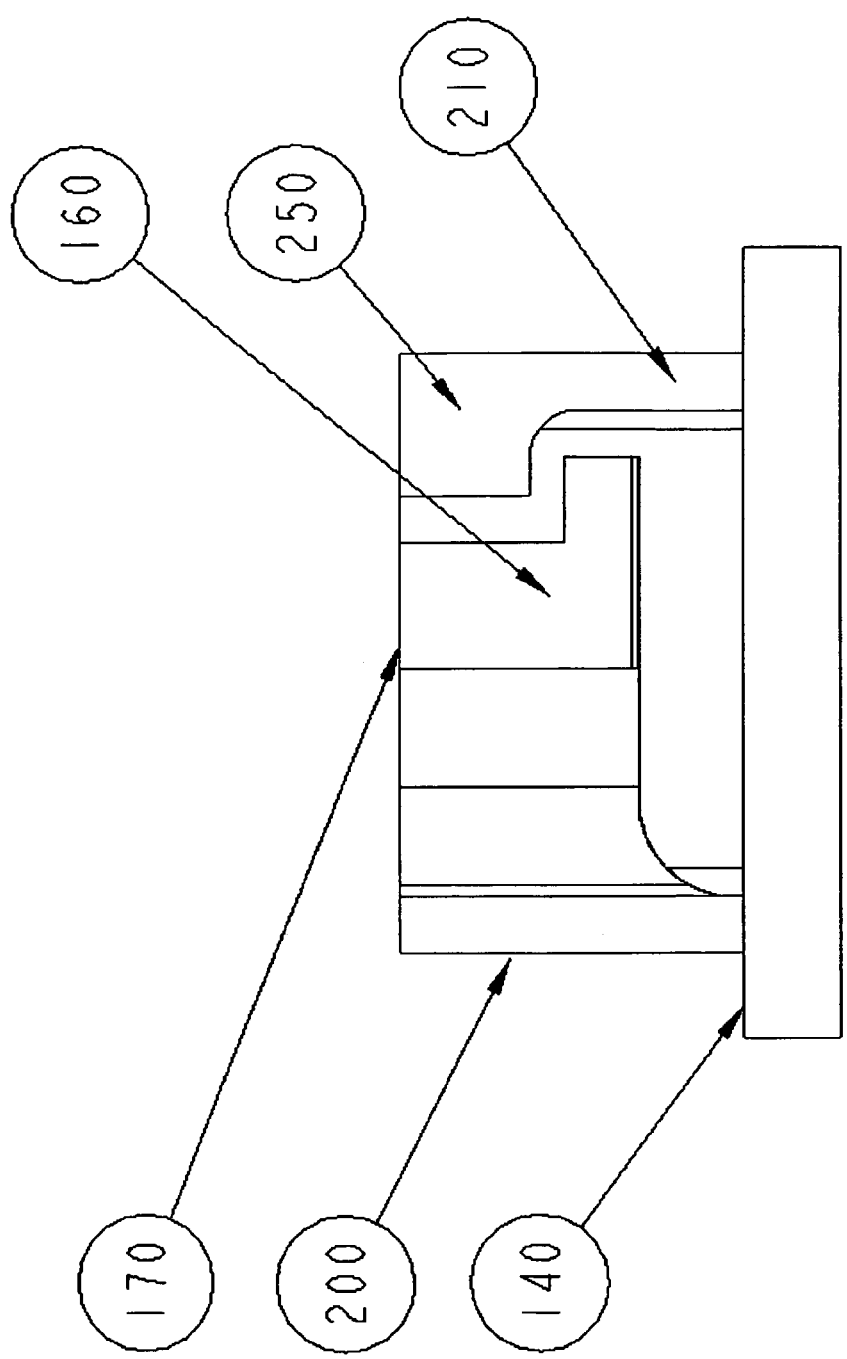
FIG. 3 shows a frontal view of the fastener for the present invention.
Figure 4A:
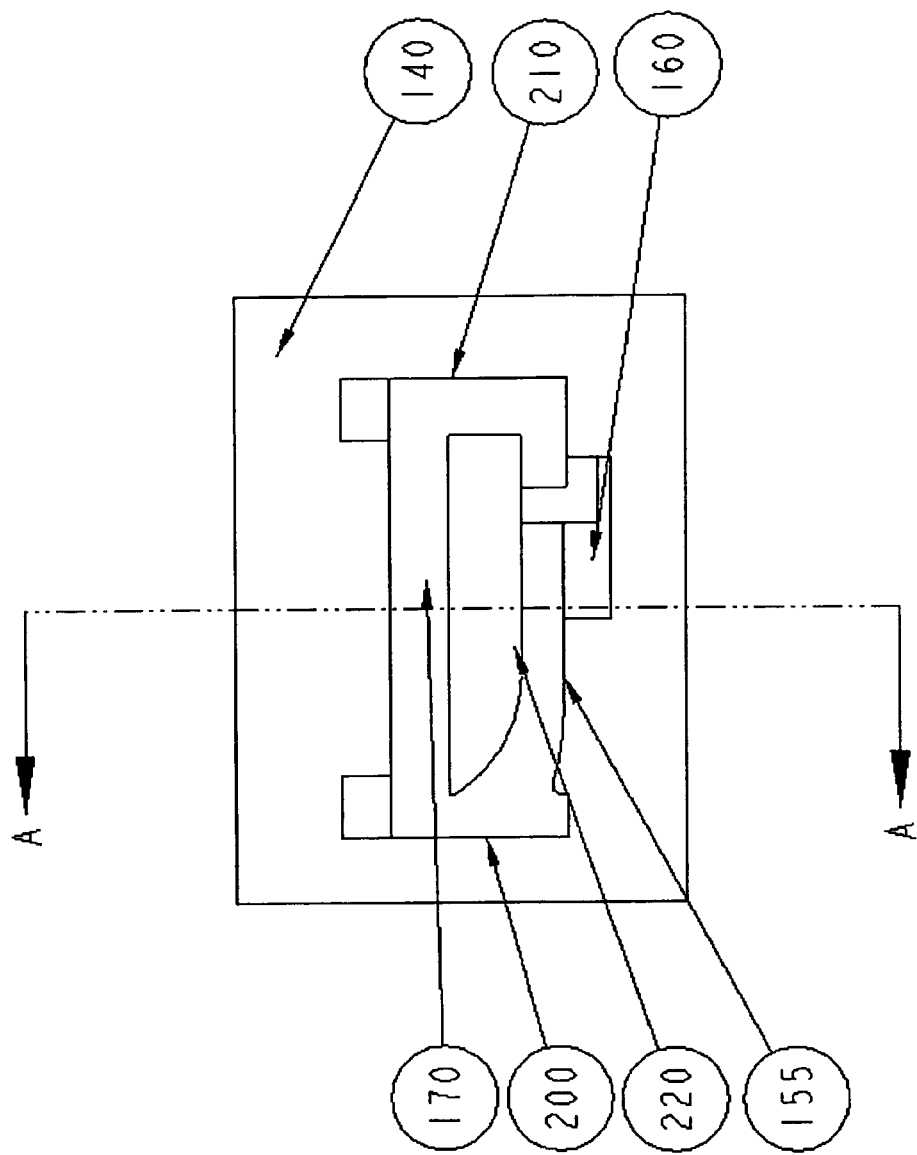
FIG. 4*a* shows an elevational view of the fastener for the present invention.
Figure 4B:
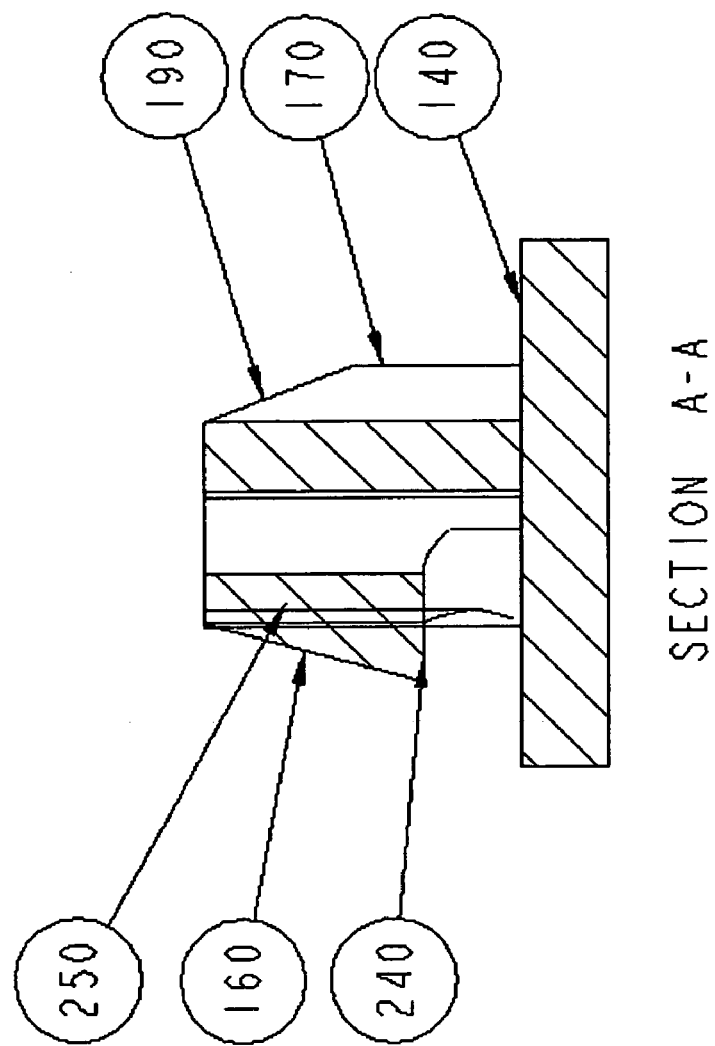
FIG. 4*b* shows a cross sectional A-A view of the fastener for the present invention.

Referring to FIG. 1, the load center 10 includes an enclosure 20, ground lug 30, supporting basepan 40 mounted there in, door 50, door latch 60, bus bars 70, neutral bars 80, neutral tie bar 90, the main lugs 100, and neutral lug 110, main lug insulator 120 and distribution circuit breakers 130. In the present invention, the bus bar 70 dimensions will be specified by customer requirements prior to load center 10 assembly.

The basepan 40 includes a first surface 140 upon which an electrical component such as a bus bar 70 can be mounted to distribute electric power from an incoming utility power line to a plurality of individual circuits through circuit breakers 130. The bus bar 70 is secured to the basepan 40 by a fastening assembly 150.

Referring to FIGS. 2-4*b*, the fastening assembly 150 utilizes two main structures comprising an arm 155 with at least one engaging lock 160 affixed thereto and a self aligning support post 170. The self aligning support post 170 projects perpendicularly from the basepan first surface 140. The self aligning support post structure 170 also contains an angled surface 190 along the back wall of the self aligning support post 170 that facilitates the top-down assembly of load center 10 and prevents any lateral motion of an electrical component being secured to the basepan 40. The self aligning support post 170 is vertically flush with two side extending walls 200, 210 that create an interior cavity 220 (FIG. 4a) which houses the arm 155. The self aligning support post 170 and the two size extending walls 200, 210 are integrally formed. The arm 155 is affixed to the side extending wall 200 by molding and is flush with the top portion of the self aligning support post 170 creating uniformity in height of the fastening assembly 150. The arm 155 includes an engaging lock 160 affixed to its front dorsal surface that functions to overhang the bus bar 70 and vertically constrain bus bar 70. The arm 155 is generally rectangular in shape and does not contact the electrical component being secured to the basepan first surface 140. Others skilled in the art may select an alternate shape for the arm 155 including, round, square, oblong, or cylindrical, each with varying rounded edge geometries based on manufacturing needs. Similarly the engaging lock 160 consists of a first surface 230 inclined towards the basepan 40 at a non zero angle. The engaging lock 160 also consists of a second surface 240 having a zero angle with respect to the basepan 40. In the preferred embodiment, first surface 230 intersects second surface 240 at a round edge 245 to reduce high stresses that manifest during bus bar 70 insertion. The distance of engaging lock 160 from basepan first surface 140 will be predetermined based on several factors including the material thickness of the bus bar 70 and current process capability of producing the bus bar 70. Additional round edges are located at the juncture of the extension stopper 250 and the side extending wall 210, between arm 155 contacting side extending wall 200 and blending into back wall 260, and the front vertical surface where arm 155 intersects side extending wall 200.

The fastener assembly 150 is constructed of thermo plastic and operates by applying a downward force that is perpendicular to the basepan first surface 140 until the arm 155 engages and prevents the bus bar 70 from moving. Those skilled in the art may use a polyphenylene oxide dyrene (ppo) grade of Noryl SE1X or ASAHI 540V to construct the fastener assembly 150. However, others skilled in the art may vary materials used to construct the fastener assembly 150. The self aligning support post 170 is a self aligning structure with at least one angled side that facilitates vertical assembly and mounting of the bus bar 70 to the basepan first surface 140. The outwardly angled surfaces 190 are configured to locate the bus bar 70 or other electrical component with respect to the basepan 40. An extension stopper 250 located generally on the upper portion of the side extending wall 210. The extension stopper 250 prevents excessive strain levels from occurring to the arm 155 when an upward force is applied to the bus bar 70.

Once the electronic component comes into contact with the engaging lock 160, the arm 155 will flex toward the back wall 260 of the self aligning support post 170 to allow the electronic component to fall under the engaging lock 160. The distance between the engaging lock second surface 240 and the basepan first surface 140 will be dictated and predetermined by the thickness of the electronic component being mounted.

The engaging lock 160 prevents vertical movement of the busbar that also projects away from the basepan first surface 140. The bottom surface of the engaging lock 160 is aligned with the bottom surface of the arm 155. The arm 155 and self aligning support post 170 are in close proximity however do not contact each other.

The fastener assembly 150 works by applying a downward force that is perpendicular to the basepan first surface 140 until the arm 155 engages and prevents the bus bar 70 from moving. The self aligning support post 170 pre-positions the bus bar 70 just before a downward force is applied by a press or manual assembly. The self aligning support post 170 is sized so that there is sufficient space between the bus bar 70 and the self aligning support post 170 to be located. There is no movement of the bus bar 70 in either the vertical or horizontal direction eliminating interference. The additional force necessary to place the bus bar 70 on the fastening assembly 150 makes assembly possible. This will also eliminate lateral movement of the bus bar 70 once assembly has been completed. A downward force perpendicular to the basepan first surface 140 will trigger movement to the engaging lock 160. The engaging lock 160 and arm 155 will initially move away from the middle plane perpendicular to the basepan first surface 140 and then return back to its initial position. As a result, the engaging lock 160 will not be in a pre-loaded state in order to hold the bus bar 70 in place (in a direction perpendicular to the basepan first surface 140). The engaging lock 160 will only be under load if a force opposite the downward force is applied to the bus bar 70. However, the engaging lock 160 will prevent the bus bar 70 from disengaging. The amount of force required to release the bus bar 70 will be dependent on the type of material selected. Preferably, a material achieving no less than a 50 lb pull out force to disengage the bus bar 70 is used.

While the foregoing description and drawings represent the preferred embodiments of the present invention, it will be apparent to those skilled in the art that various changes and modifications may be made therein without departing from the true spirit and scope of the present invention.

The invention claimed is:

1. A load center comprising: an enclosure, a basepan mounted with the enclosure for distributing a load to a circuit breaker, a basepan first surface for securing electrical components with a fastener assembly wherein the fastener assembly comprises a self aligning support post flush with at least one extending side wall and an arm with engaging lock affixed thereto for securing the at least one electrical component to the basepan first surface.

2. The load center according to claim 1, wherein the self aligning support post includes at least one non-zero angled surfaces to facilitate assembly of the electrical components.

3. The load center according to claim 1, wherein the self aligning support post and the at least one side extending wall are integrally formed.

4. The load center according to claim 1, wherein the self aligning support post includes an interior cavity to house the arm.

5. The load center according to claim 1, wherein the arm is shaped as a rectangle, square, round, oblong, or cylinder.

6. The load center according to claim 1, wherein the engaging lock is affixed to the arm by molding.

7. The load center according to claim 1, wherein the engaging lock comprises at least a first and a second surface.

8. The engaging lock according to claim 7, wherein the first surface is inclined at a non-zero angle with respect to the first surface of the basepan.

9. The engaging lock according to claim 7, wherein the second surface is angled at zero degrees with respect to the first surface of the basepan.

10. The engaging lock according to claim 7, wherein the first surface intersects the second surface at a rounded edge.

11. The load center according to claim 1, wherein a bottom surface of the engaging lock is aligned with a bottom surface of the arm.

12. A basepan for securing electrical components in a load center comprising:
- a basepan first surface wherein at least one electrical component is secured after mounting; and
- a fastener assembly comprising a self aligning support post flush with at least one extending side wall and an arm with engaging lock affixed thereto for securing the at least one electrical component to the basepan first surface.

13. The basepan according to claim 12, wherein the self aligning support post and the at least one extending side wall are integrally formed.

14. The basepan according to claim 12, wherein the self aligning support post includes at least one non-zero surface to facilitate assembly of the electrical component.

15. The basepan according to claim 12, wherein the self aligning support post includes an interior cavity to house the arm.

16. The basepan according to claim 12, wherein the engaging lock affixed to the arm by molding.

17. The basepan according to claim 12, wherein the engaging lock comprises at least a first and second surface.

18. The engaging lock according to claim 17, wherein the first surface is inclined at a non-zero angle with respect to the basepan first surface.

19. The engaging lock according to claim 17, wherein the second surface is angled at zero degrees with respect to the basepan first surface.

20. A method to secure an electrical component to a basepan, the method comprising:
- mounting the electrical component to the basepan;
- providing a fastening assembly comprising a self aligning support post flush with at least one extending side wall and an arm with engaging lock affixed thereto for securing the electrical component to the basepan first surface; and
- securing the electrical component with the fastening assembly.

21. The method of claim 20, wherein the self aligning support post includes at least one non-zero angled surface to facilitate assembly of the electrical components.

22. The method of claim 20, wherein the self aligning support post and the at least one extending side wall are integrally formed.

23. The method of claim 20, wherein the self aligning support post includes an interior cavity to house the arm.

24. The method of claim 20, wherein the arm is rectangular, square, round, oblong or cylinder shaped.

25. The method of claim 20, wherein the engaging lock is affixed to the arm by molding.

26. The method of claim 20, wherein the engaging lock comprises at least a first surface and a second surface inclined respectively at a non zero and zero angle with respect to the first surface of the basepan.

* * * * *